US007428706B2

(12) United States Patent
Hagan et al.

(10) Patent No.: US 7,428,706 B2
(45) Date of Patent: Sep. 23, 2008

(54) METHOD OF CUSTOMIZING A USER'S BROWSING EXPERIENCE ON A WORLD-WIDE-WEB SITE

(75) Inventors: Thomas Hagan, Ho-Ho-Kus, NJ (US); David Levy, Sterlington, NY (US)

(73) Assignee: PersonalPath Systems, Inc., Upper Saddle River, NJ (US)

( * ) Notice: Subject to any disclaimer, the term of this patent is extended or adjusted under 35 U.S.C. 154(b) by 812 days.

(21) Appl. No.: 10/689,988

(22) Filed: Oct. 22, 2003

(65) Prior Publication Data

US 2004/0088355 A1    May 6, 2004

Related U.S. Application Data (62) Division of application No. 09/469,102, filed on Dec. 21, 1999, now Pat. No. 6,734,886.

(51) Int. Cl.
*G06F 15/00* (2006.01)
*G06F 13/00* (2006.01)

(52) U.S. Cl. ........................... 715/738; 715/736

(58) Field of Classification Search ......... 715/736–738, 715/853–854, 744–745, 764, 800, 792, 798, 715/759, 740–743; 726/1–26; 707/1, 102
See application file for complete search history.

(56) References Cited

U.S. PATENT DOCUMENTS 5,561,757 A * 10/1996 Southgate ............... 715/790

| | | |
|---|---|---|
| 5,754,938 A | 5/1998 | Herz et al. |
| 5,875,302 A | 2/1999 | Obhan |
| 5,915,001 A | 6/1999 | Uppaluru |
| 5,996,076 A | 11/1999 | Rowney et al. |
| 6,052,730 A | 4/2000 | Felciano et al. |
| 6,206,829 B1 * | 3/2001 | Iliff ............................ 600/300 |
| 6,310,631 B1 * | 10/2001 | Cecco et al. ................. 715/792 |
| 6,680,999 B1 * | 1/2004 | Garcia ...................... 379/88.22 |
| 2002/0191028 A1 * | 12/2002 | Senechalle et al. .......... 345/800 |
| 2006/0271869 A1 * | 11/2006 | Thanu et al. ................ 715/764 |

* cited by examiner

*Primary Examiner*—Cao Nguyen
(74) *Attorney, Agent, or Firm*—Whitham Curtis Christofferson & Cook, PC (57) ABSTRACT

In accordance with a first aspect of the present invention, a method of customizing the browsing experience of a user of a Web site comprised of a plurality of Web pages is provided. Each Web page is indexed using at least one coding system. A user record for each user is maintained on the Web site, which contains personal information of the user coded in accordance with said coding system. The user's browsing experience on the site may thus be readily customized using the user's personal information via code comparison. In accordance with a second aspect of the present invention, a method of ensuring the privacy of the user's personal information is provided through use of a unique Universal Anonymous Identifier (UAI) assigned to each user by a third party registration authority.

3 Claims, 8 Drawing Sheets

METHOD OF CUSTOMIZING A USER'S BROWSING EXPERIENCE ON A WORLD-WIDE-WEB SITE

This application is a division of U.S. patent application Ser. No. 09/469,102, filed Dec. 21, 1999 now U.S. Pat. No. 6,734,886.

BACKGROUND OF THE INVENTION

1. Field of the Invention

The present invention relates to a method of customizing a user's browsing experience on a World-Wide-Web site. More particularly, the present invention relates to a method of customizing the browsing experience of a user of a healthcare related World-Wide-Web site based on the personal medical history of the user, as well as a method of maintaining user privacy and confidentiality while using information contained in the user's medical history on that user's behalf.

2. Description of the Prior Art a. The Internet and World-Wide-Web

As those of ordinary skill in the art know, the Internet is a global computer network which comprises a vast number of computers and computer networks which are interconnected through communication links. The interconnected computers exchange information using various services, such as electronic mail, Gopher and the World Wide Web (hereinafter, the "WWW").

The WWW allows a server computer system (a Web server) to send graphical Web pages of information to a remote client computer system. The remote client computer system can then display the Web pages. Each Web page (or link) of the WWW is uniquely identifiable by a Uniform Resource Locator (URL). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A browser is a special-purpose application program that effects the requesting of Web pages and the displaying of Web pages. Commercially available browsers include Microsoft Internet Explorer™ and Netscape Navigator™.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

Because of its graphical and user friendly nature, the WWW is particularly well suited for e-commerce, i.e. the transacting of business on-line. Today, thousands of companies throughout the world provide goods and services to clients using Web sites. Users contact Web sites to obtain specific information or to obtain the goods and/or services being offered by a particular company. The present invention relates to a healthcare related Web site which is used to provide healthcare information and other services to clients.

b. Customization

In order to provide enhanced service to its users, a Web site may attempt to customize the browsing experience of its users on a user-by-user basis. A Web site will typically collect overt information from a user, such as interface preferences and content of interest, via forms and mouse clicks. Covert information, on the other hand, is collected by tracking the usage habits such as Web pages visited, time spent per page, frequency dates and times of visits, etc. This information is typically recorded in some combination of databases on the web application server and cookies on the user's browser. On subsequent visits by the user to the Web site, Web pages will be suggested to the user based on the user's prior browsing history.

This prior art method of customization, however, is limited in its usefulness since the browsing history of a user is not necessarily the best way to determine where a user may choose to browse in the future since the interests of the user may change from day to day. Ideally, the best way to customize a Web site browsing experience is to use personal information of the user in order to make an informed determination as to which Web pages are likely to be of interest to the user. This method, however, has not been heretofore possible since, even assuming the Web site has access to the user's personal information, a method for categorizing and quantifying the personal information in a way that will enable a programmed computer to manipulate the information so as to determine Web pages which are likely to be of interest to the user has been heretofore unknown.

When dealing with healthcare related Web sites, the issue of customization takes on added importance since the information being sought by the user will often relate to a medical problem of the user. A typical user, who is not medically trained, will not necessarily know which Web pages will be of help to him/her as it relates to his/her medical problem. Therefore, the ability to suggest Web pages to the user, which will be of interest and of help to the user, is of immeasurable value and importance.

Accordingly, it is an object of the present invention to provide a new method of customizing the browsing experience of users of a WWW site in general, and to provide a new method of customizing the browsing experience of users of a healthcare-related WWW site through use of the medical histories of the users in particular.

c. Internet Privacy

The issue of Internet privacy is one of the leading issues in cyberspace today, arising from the fact that many Web sites collect personal information from their users (e.g., a Web site which sell products may collect and store the name, address and credit card number of its customers). When dealing with highly sensitive information such as personal medical records, the issue of on-line privacy takes on added importance.

To protect privacy on the Internet, the United States has enacted legislation and has legislation pending designed to protect Internet users from misuse and unapproved dissemination of their personal information. Additionally, most Web sites use state of the art techniques to ensure the confidentiality of the data stored on their sites as well as data transferred over the Internet. Despite these efforts, as those of ordinary skill in the art know, personal information is not 100% secure on the Internet.

Accordingly, it is also an object of the present invention to provide a new method of ensuring the privacy of personal information on the Internet in general, and ensuring the privacy of medical records in particular.

Personal medical information has been used for quite some time by the medical industry without violating the privacy of the patients to whom the data refer. In most cases this is done by aggregating (summarizing collections of) the information into groups sufficiently large such that no individual can be identified. For uses where individual information is needed, this has been accomplished by the simple expedient of removing all information that can be used, either individually or in combination, to identify the name of the patient. In many cases the information does not have to be completely removed, but can be "weakened" to where it is non-identifying (e.g., replace birthday with birth year, or "before 1910" for patients where even the birth year might be identifying; replace zip code with Census Bureau Metropolitan Statistical Area (MSA) or equivalent). If an individual needs to be tracked over a number of data sources, a unique identifier (UID) is appended to the information in the place of a name or social security number. The supplier of the medical data knows who the UID refers to, but the user of the data does not. However, by combining all data held under a given UID, individuals can be tracked over many data sources, source records, and time periods.

The weaknesses of the UID approach for use on a third party, personalized Web site is threefold. First, supplier UIDs change with time, and are not consistent among suppliers. Therefore, a supplier-based UID is not valid within a supplier for more than a few years, and cannot be used to track a patient between suppliers at all. Second, using a supplier assigned UID might let the supplier inappropriately gather information provided by a patient to the third party Web site. Third, the standard UID scheme offers no mechanism by which a patient can access his/her medical data without the Web site knowing the identity of the patient.

The Universal Anonymous Identifier$^{SM}$ methodology presented herein is a significant enhancement of the state of the art in standard UID processing in the healthcare industry and solves the issues with the standard UID approach that are mentioned above.

SUMMARY OF THE INVENTION

In accordance with a first aspect of the present invention, a healthcare related Web site comprising a plurality of Web pages indexed by industry standard medical codes, such as ICD-9-CM, CPT-4, NDC and HCPCS J-codes, is provided.

As those of ordinary skill in the art know, ICD-9 coding is based on the official version of the World Health Organization's 9th Revision, International Classification of Diseases. ICD-9 is designed for the classification of morbidity and mortality information for statistical purposes, for the indexing of hospital records by disease and operations, and for data storage and retrieval. ICD-9 is an industry standard classification system. ICD-9-CM (The International Classification of Diseases, 9th Revision, Clinical Modification) is a clinical modification of ICD-9. The term "clinical" is used to emphasize the modification's intent to serve as a useful tool in the area of classification of morbidity data for indexing of medical records, medical care review, and ambulatory and other medical care programs, as well as for basic health statistics. To describe the clinical picture of the patient, the ICD-9-CM codes must be more precise than the ICD-9 codes which are intended only for statistical groupings and trend analysis.

CPT-4, or Current Procedural Terminology, Fourth Edition, is a systematic listing and coding of procedures and services performed by physicians. Each procedure or service is identified with a five digit code. The use of CPT-4 codes simplifies the reporting of services. With this coding and recording system, the procedure or service rendered by the physician is accurately identified. Inclusion of a descriptor and its associated specific five-digit identifying code number in CPT-4 is generally based upon the procedure being consistent with contemporary medical practice and being performed by many physicians in clinical practice in multiple locations. CPT-4 coding is an industry standard.

NDC (Food and Drug Administration (FDA), National Drug Code Directory) was originally established as an essential part of an out-of-hospital drug reimbursement program under Medicare. The NDC serves as a universal product identifier for human drugs. The current edition of the National Drug Code Directory is limited to prescription drugs and a few selected over-the-counter products.

The Health Care Financing Administration (HCFA) Common Procedure Coding System (HCPCS), Section 4541 (a)(2) of the Balanced Budget Act (BBA) (P.L. 105-33), which added §1834(k)(5) to the Social Security Act, requires that claims for outpatient rehabilitation services be reported using a uniform coding system. This coding requirement is effective for claims for outpatient rehabilitation services submitted on or after Apr. 1, 1998 and is needed to assure proper payment under a prospective payment system for outpatient rehabilitation services which will be effective Jan. 1, 1999. HCFA has chosen HCPCS as the uniform coding system. Section J of HCPCS reports drugs administered through other than an oral method (codes J0110 through J8999).

A user record for each user is maintained on the Web site containing the medical history of the user in medical code format. Based on a user's medical code history, the user's browsing experience on the site may be readily customized in a number of ways, some typical, but non-exhaustive examples of which will be described. According to one method, Web pages having medical codes similar to the user's medical code history may be suggested to the user upon log in to the Web site. According to another method, searches conducted by a user on the Web site may be automatically modified to search for Web pages relating to the medical code history of the user. According to yet another method, Web pages may be suggested to a user based on those Web pages visited by users with similar medical code histories. According to yet another method, profiles may be created into which users with similar medical code combinations may be grouped. Based on the navigation history of users within the same profile group, Web pages may be suggested to a user.

By using medical code indexing, the present invention also makes it possible to analyze statistically the browsing habits of users with similar medical conditions. This analysis forms the basis for providing customized service based on Web pages which are likely, statistically speaking, to be of interest to users with similar medical conditions.

In accordance with a second aspect of the present invention, because the users' personal medical records are being used to customize their browsing experience, it is necessary to ensure the privacy of those records. The privacy of each user is ensured through use of a unique Universal Anonymous Identifier (UAI) assigned to each user. The UAI is generated by a third party called a registration authority and provided to the Web site operator. The Web site operator then indexes the de-identified medical data by UAI.

The present invention will now be described in detail with frequent reference being made to the drawings identified below, in which identical numerals represent identical elements.

DETAILED DESCRIPTION OF THE PREFERRED EMBODIMENT

The present invention relates to a Web site which is used to provide healthcare related information and other related services to users. However, it will be realized by those of ordinary skill in the art that the concepts disclosed herein are not limited to use with healthcare related Web sites, but may be used with any type of Web site.

In particular, the present invention relates to Franklin Health, Inc.'s (the assignee of the present invention) Web site, PersonalPath$^{SM}$, which can be found on the Internet at www-.personalpath.com. PersonalPath$^{SM}$ is a service provided by Franklin Health to health plans which have contracted with Franklin Health. Under the basic business model, health plan members may access the PersonalPath$^{SM}$ Web site to obtain healthcare related information and other services of interest to them. As discussed in detail below, the personal medical history of the users obtained from the health plan will be used to customize their respective browsing experiences on the Web site.

a. Web Site Architecture

Figure 1:
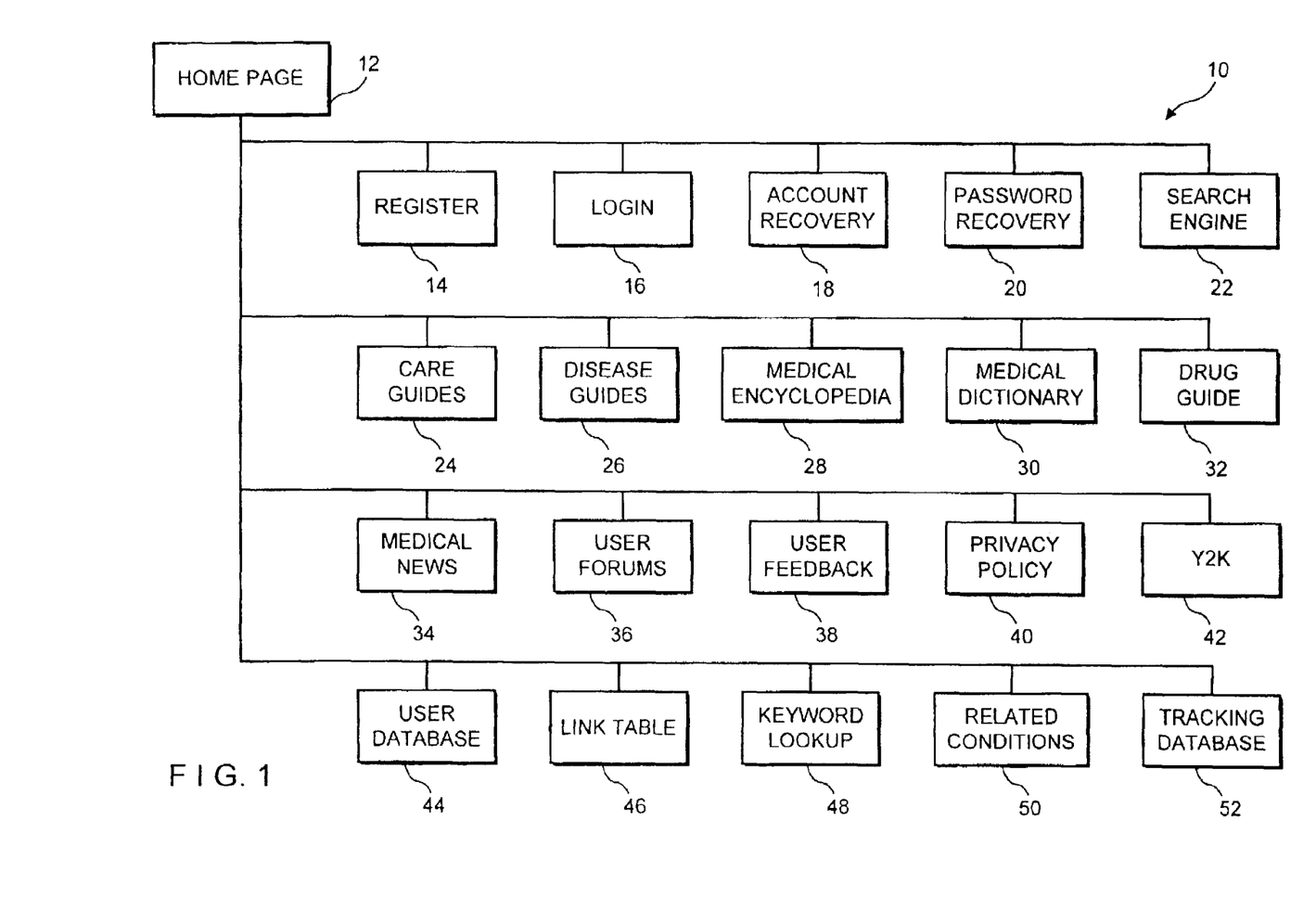
FIG. 1 is a site map of a Web site which may be used in accordance with the present invention.

A basic site map for a healthcare related Web site 10 which may be used to practice the present invention is shown in FIG. 1. It will be understood by those of ordinary skill in the art that the Web site architecture shown in FIG. 1 is merely illustrative and that any Web site architecture may be used to practice the present invention.

Referring to FIG. 1, the Web site 10 includes a home page 12; a registration page 14 which may be used by a new user to register with the Web site 10; a login page 16 into which a registered user enters a unique Web ID and password to gain access to the data on the Web site 10; an account recovery page 18; a password recovery page 20; and a search engine 22 which a user may use to search the Web site 10. The Web site 10 also includes care guides 24, disease guides 26, a medical encyclopedia 28, a medical dictionary 30 and a drug guide 32 which may be accessed by users to obtain medical information, and which can be customized based on the users' medical and navigation histories.

Care guides 24 address the many non-medical issues that face an ill person and their loved ones and are universally written for everyone who is sick, regardless of the disease. They focus on helping patients and their families obtain information, find resources, anticipate and solve problems, work with their doctors, and understand and navigate the health care system. Disease guides 26 provide user-friendly information on specific diseases. A medical encyclopedia 28, a medical dictionary 30 and a drug guide 32 which provide general medical information as well as information on medications, their dosages, actions, side effects, interactions with other medications, are also provided.

The Web site also includes miscellaneous pages such as a medical news page 34, a user forums page 36, a user feedback page 38, as well as a privacy policy 40 and a Y2K statement 42.

The Web site 10 also includes a series of databases which are not accessible by the Web site users, but which are used by the Web site 10 for administrative purposes, including customization. These databases include a user database 44 which contains the medical history of the Web site users in ICD-9-CM, CPT-4, NDC and HCPCS J-code formats; a link table 46 in which every Web page on the Web site is indexed by keyword (including individual words as well as phrases) ICD-9-CM, CPT-4, NDC and HCPCS J-code; a keyword to ICD-9-CM/CPT-4/NDC/HCPCS J-code look-up table 48 which correlates keywords to related ICD-9-CM, CPT-4, NDC and HCPCS J-codes; a table of related conditions 50 which correlates related ICD-9-CM, CPT-4, NDC and HCPCS J-codes; and a tracking database 52 which contains tracking information for each user of the Web site 10. The use of these various databases in customization will be discussed in greater detail below.

Figure 2:
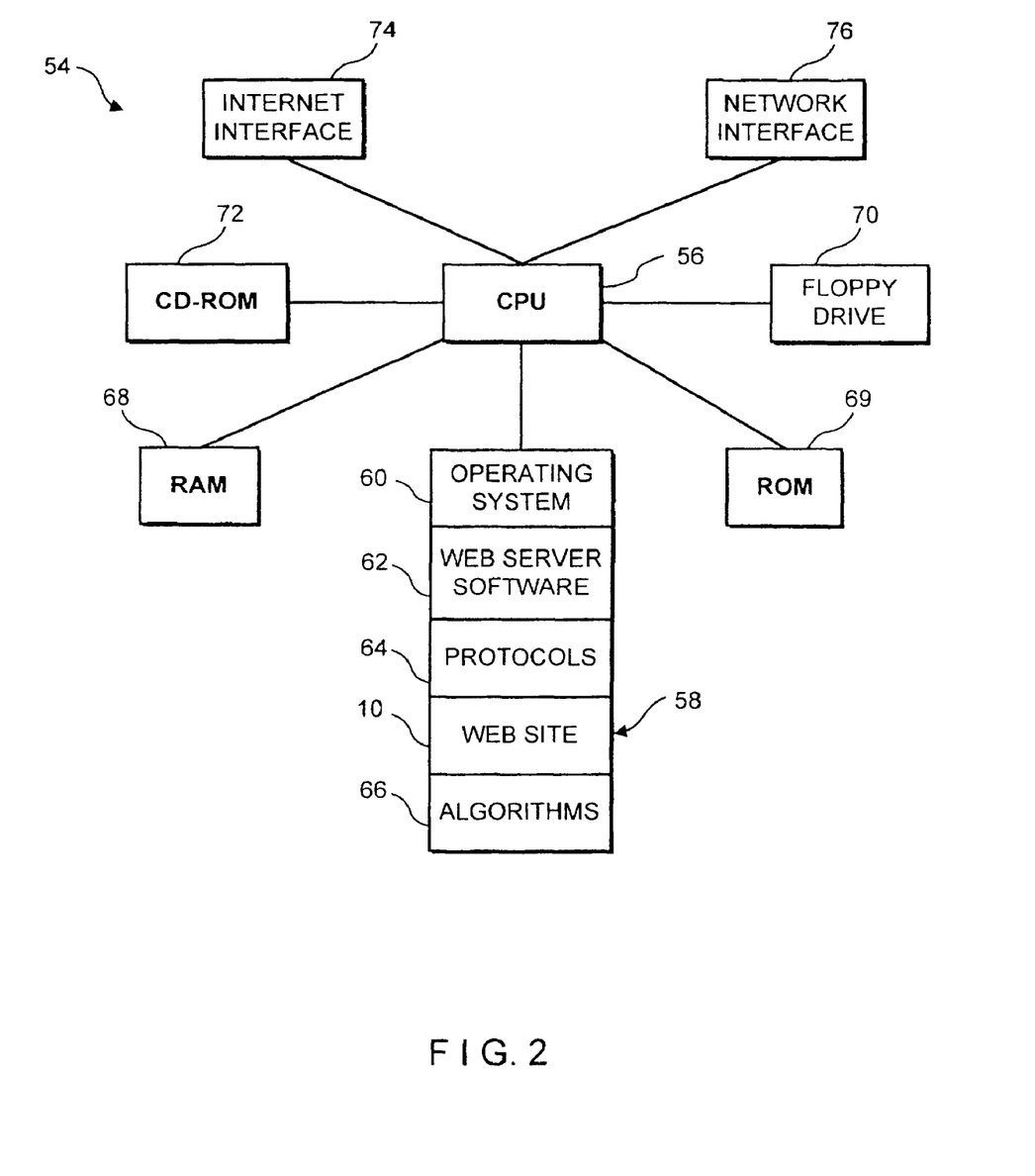
FIG. 2 is a schematic diagram of one of the many possible Web servers able to support the computational needs of the present invention.

Referring to FIG. 2, the Web site 10 is located on a Web server 54. A Web server is a computer that provides World Wide Web services on the Internet. Such a computer includes the necessary hardware, operating system, Web server software, communications protocols and the Web site content (Web pages) to provide the services. It will be understood by those of ordinary skill in the art that the particular details of the Web server 54 are largely irrelevant to the present invention. So long as the Web server 54 is capable of performing the functions described herein, any configuration will suffice.

As shown in FIG. 2, the Web server 54 includes a central processing unit (CPU) 56 for controlling the operation of the Web server 54, a hard disk drive 58 which includes the operating system 60, the necessary Web server software 62, the communications protocols 64, the Web site 10 content and a set of algorithms 66 for performing the various functions described herein, a random access memory (RAM) 68, a read only memory (ROM) 69, a floppy drive 70, a CD-ROM drive 72, an Internet interface 74 which connects the Web server 54 to the Internet, and a network interface 76 which connects the Web server 54 to the Operator's internal computer network. A similar configuration may be used for the other web servers discussed herein (i.e., the Registration Authority server and Certificate Authority server).

A typical configuration for the Web server 54 includes an Intel IP L440GX Motherboard; a Dual Intel PIII 500 mhz Processor; 256 mb 100 mhz SDRAM; 9.1 gb Ultra2/SCSI Hard Disk Drive; a Creative Labs 52×CD ROM; 3.5" 1.44 mb Floppy Disk Drive; Dual Intel PRO/100+Dual Port Server Adapters; Antec Rackmount ATX Case; Microsoft Windows NT Server V4.0 Service Pack 5; Microsoft IIS Option Pack v4; and Microsoft Data Access Components.

b. Data Flow for Assimilating Plan Data

As discussed above, in accordance with the present invention, the Web site operator (hereinafter, the "Operator") will contract with a health plan administrator (hereinafter, the "Health Plan") to provide healthcare services to members of the health plan (hereinafter, the "Users") via the Web site 10.

As discussed in greater detail below, each User will have a unique Web ID and password which will enable the User to log on to the Web site 10 and gain access to the information and other services provided on the Web site 10 by the Operator.

Because the Users' personal medical histories will be used to customize their respective browsing experiences, measures must be taken to ensure the confidentiality of this information. In accordance with the present invention, this confidentiality is ensured in that the Operator is only provided with de-identified clinical data which is indexed by a Universal Anonymous Identifier$^{SM}$, or UAI$^{SM}$.

Figure 3:
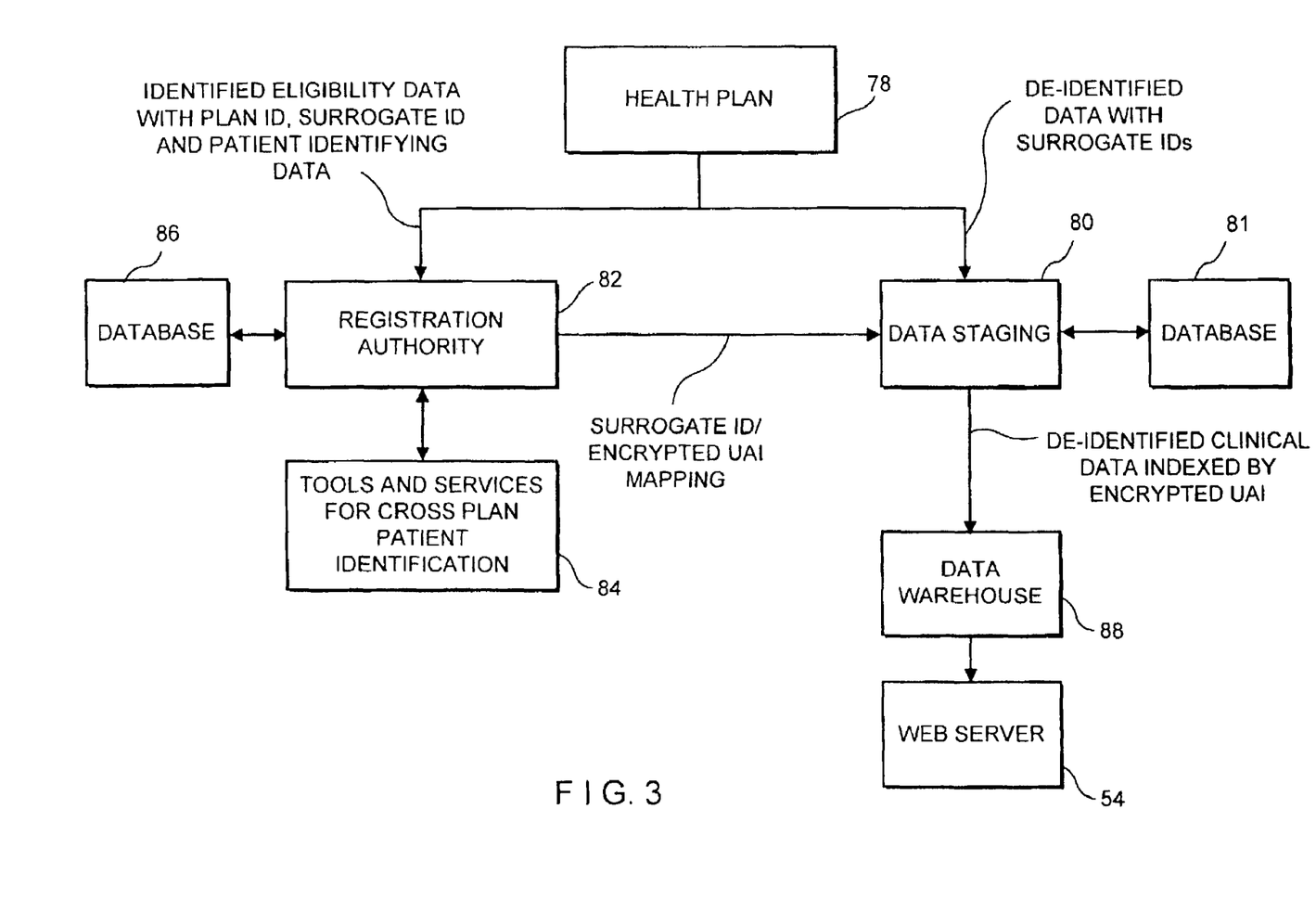
FIG. 3 is a block diagram illustrating the transfer of user data from the Health Plan to the Operator.

Referring to FIG. 3, the Health Plan 78 will periodically, such as on a monthly basis, provide de-identified clinical data (i.e., medical history data) for the Users to the Operator. The de-identified clinical data for the Users includes, but is not necessarily limited to, ICD-9-CM, CPT-4, NDC and HCPCS J-codes, as well as other de-identified data such as age, birth year, sex and dates of illnesses and procedures, prescriptions, geographic information, etc. This geographic information is generalized into Census Bureau "Metropolitan Statistical Areas" for cities and supporting counties totaling a minimum of 50,000 individuals, "Public Use Micro-data Areas" guaranteed to have at least 100,000 individuals or equivalent aggregate areas instead of zip code. Thus, the Operator does not know the true identity of any of the Users. There are exceptions, however, such as where the User wishes the Operator to know its identity for purposes of personal care management.

Referring again to FIG. 3, the Health Plan 78 maintains the clinical data and eligibility data (e.g., name, address, telephone number, age, sex, family status, financial fields, etc.) of the Users in its internal computer systems. To easily identify the Users, each User is assigned a unique surrogate ID, which will typically be a unique alphanumeric string.

During the periodic data transfer, the Health Plan 78 will transfer to the Operator de-identified clinical data for the Users indexed by surrogate ID. Typically, this transfer will be accomplished by a magnetic tape mailed to the Operator via U.S. mail or overnight courier on a monthly basis. However, the transfer may be accomplished in any number of ways, such as over a computer network such as the Internet. This data is received and uploaded to the Operator's data staging computer 80, where it is processed into a form suitable for use by the Operator.

At the same time the magnetic tape is mailed to the Operator, a second magnetic tape is sent to a trusted third party called a Registration Authority. This second tape will contain, for each User, identified eligibility data with the health plan ID, the surrogate ID, and patient identifying data. The Registration Authority does not receive any clinical data. The Registration Authority does, however, maintain detailed identifying data, enriched with third party tools and databases to support its mission of assigning only a single UAI to an individual throughout that individual's life. Once again, the magnetic tape method is used for security means, but any method of data transfer may be used.

Once the data is received by the Registration Authority and uploaded to its server 82, a unique UAI, which will typically be a unique alphanumeric string, is created and assigned to each User by the Registration Authority server 82. If a UAI had been previously assigned to a User, then that previously assigned UAI will be used. Once a UAI is assigned to a User by the Registration Authority, the UAI never changes. Thus, a User may easily migrate across health plans without an interruption in service since the UAI is generated by the Registration Authority and not the Health Plan. The Registration Authority server 82 contains tools and services 84 to facilitate cross plan User identification. The identified non-clinical data received from the Health Plan is stored in its database 86 indexed by UAI.

After the UAIs are assigned and/or correlated to the identifiable data received from the Health Plan 78, the Registration Authority server 82 will generate and transfer a surrogate ID/UAI map to the Operator's data staging computer 80, which will correlate the surrogate IDs which it has received from the Health Plan with their corresponding UAIs. The map will preferably be sent in an encrypted form under the data staging computer's public key. This transfer will typically be done using the magnetic tape method as well, although it can be done using any method of data transfer.

The indexed clinical data is then stored in the database 81 for reference and downloaded to the Operator's data warehouse server 88. After the data is stored in the data warehouse server 88, it is uploaded to the Web server 54 via the Operator's internal computer network and stored in the user database 44. The UAIs are encrypted by the Registration Authority before being passed to the Web site (via the data staging computer 80) using first the Registration Authority server's public key and then the date warehouse server's public key. As discussed further below, the UAIs are further encrypted on the user certificates on the Users' browser, and in the Certificate Authority's database using the Web site's public key. The purpose of this chain of encryptions is to prevent simple collusion among members of the operations staff at the various facilities (the Registration Authority, Web site, and Certificate Authority are housed at different facilities, and operated by different companies using different operations staff). The sequence of encryptions represents the order in which data moves through the system when first loaded. An upstream service can recover the UAI it provided, but the recipient cannot determine how the UAI was represented in the provider. Since both public and private keys are buried deeply in the code, only technical staff with sufficient time, opportunity, and skill to find and determine how to utilize the keys might be able to collude to compromise the system. This should be significantly beyond the technical ability of routine operations staff. As always, the senior technical operation staff present a security risk that must be managed by non-technical means such as incentives and penalties.

With respect to the upload to the data warehouse server 88, recent clinical data for registered Users (i.e., since the last upload) are extracted from the relevant data warehouse tables and staged for transport to the Web site 10. The extract file is uploaded (typically, but not necessarily) via FTP (File Transport Protocol) from the data warehouse server 88 to the Web site server 54. The upload is detected by the Web site server 54, which initiates the claims data intake process. The extract file is loaded into a relational staging table for further processing. During the file to staging table load, the extracted data is validated with regard to dates and content. If the data is invalid, an error is reported to the data warehouse server 88 and Web site administrators, and data intake is halted. Otherwise, data intake continues with the clinical data in the staging table, which had been organized in a unified, non-redundant manner for efficient transmission, is reorganized into multiple, somewhat redundant intake tables for efficient data access. Certain data relevant to the operational needs of the Web site is derived from the claims information and added to certain records. For example, a pregnancy flag is set for females with the appropriate claims in the past 8 months. Backup staging tables are dropped, current operational tables are made into backup tables, intake tables are made into current operational tables, and new intake and staging stables are created.

After uploading to the Web server 54, the clinical data is stored on the Web site 10 in the user database 44. The user database 44 is a table which lists each User by UAI and includes (but is not limited to) columns containing the User's Web ID, the User's customizations activation code, the User's ICD-9-CM, CPT-4, NDC and HCPCS J-code history, the User's content profile designations, and other de-identified information of interest to the Operator. The concept of content profiling will be discussed in detail below.

c. New User Authentication

As indicated above, Users will access the Web site 10 by presenting a unique Web ID and password. However, to ensure that third parties do not obtain someone else's Web ID and password, a robust security mechanism is implemented.

Figure 4:
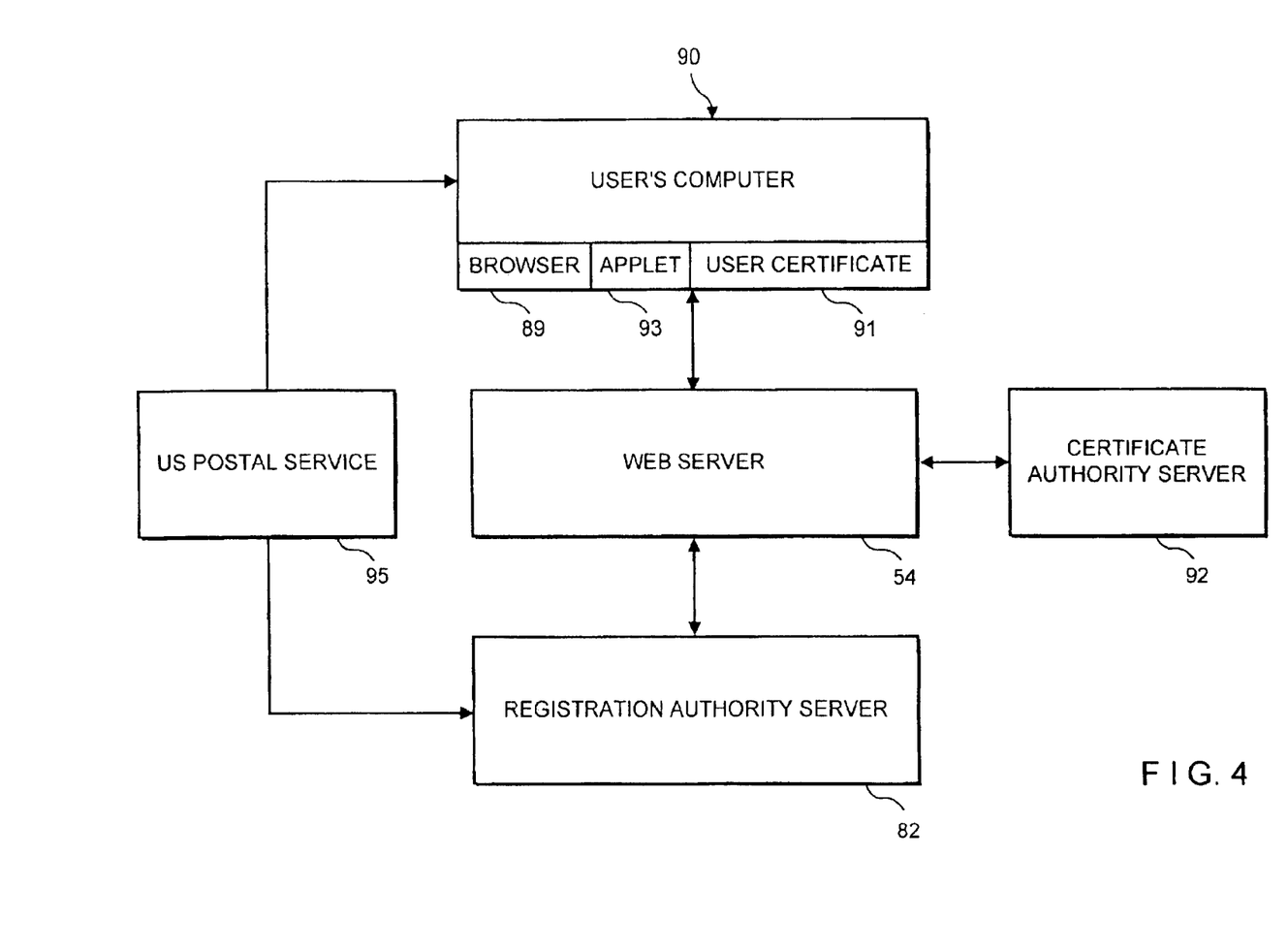
FIG. 4 is a block diagram illustrating the authentication of a new User in accordance with the present invention.

Referring to FIG. 4, a User using the Web site 10 for the first time will connect to the Web site 10 using the Web browser 89 on his/her computer 90 and click in to the registration page 14. The User's computer will typically be a conventional personal computer (PC) that includes a chassis that houses a central processing unit (CPU) and supporting circuitry, as well as a floppy drive, a hard drive and an internal modem. Connected to the CPU through the chassis will be a keyboard, a mouse and a monitor. The computer 90 will typically be coupled to the Internet via a telephone line connected to the modem, although the computer can be connected to the Internet via a high speed data transmission line. The User will typically connect to the Internet using an Internet service provider, such as Erols™ or America OnLine™, but may have a direct connection to the Internet. Although a conventional PC will typically be used by the User, the User may use any type of computer that can be connected to the Internet, including a work station on a local area network, and any operating system.

At that point the Web server 42 will pass the session to the Registration Authority by linking over the Internet to the Registration Authority server 82. In order to ascertain the UAI of the User, the Registration Authority will query the User for externally identifying information including, but not limited to, the User's name, social security number, date of birth, gender, medical plan ID, and the social security number of the principal account holder (in the case of a family). The User will input the requested information and transfer it over the Internet, in encrypted form, to the Registration Authority server 82. The Registration Authority server 82 will then check its database 86 and verify the information. If the information is incorrect, the process is terminated with a message referring the user to the appropriate contact at the user's Health Plan. If the information, however, is correct, the Web server 54 is instructed to create a Web ID for the User having UAI "x". The Web server will then ask the User to select a Web ID. The User's UAI and Web ID are then stored in the user database 44.

Next, the Registration Authority server 82 will generate a customizations activation code for the User, which will permit the User to customize his browsing on the Web site. Rather than transmitting this information to the User over the Internet, however, this information will be mailed to the User via U.S. mail 95 for added security. This mailing will not contain the User's Web ID or password, in case it is intercepted by a third party. Once the User receives the code, he/she may use the code to receive customized services on the Web site 10, as discussed below. The code is also transmitted to the Web server 54 via a secure transmission mechanism and stored in the user database 44.

After the Web ID is created, the Web server 54 links to a fourth party called a Certificate Authority in order to create the password. The Certificate Authority server 92 will first ask the User to select a password. After the password is selected by the User and transmitted to the Certificate Authority server 92, the Certificate Authority server 92 will ask the User to supply a familiar set of identifying questions and answers for use in future challenges. This is accomplished by use of encrypted forms passed through the Web server 54. The Certificate Authority server 92 finally generates a user certificate having an encrypted form of the User's password and UAI embedded therein and stores the user certificate 91 on the User's computer 90 through the Web server 54. The Certificate Authority also downloads to the User's computer 90 an applet 93 which will be used to verify the password on subsequent logins, as discussed below.

At this point, the User has a password and Web ID so that he/she can log on to the Web site 10. Those of ordinary skill in the art will appreciate that the only party which has both the User's Web ID and password is the User. Thus, to obtain the User's Web ID and password, someone would have to hack into both the Web server 54 and the Certificate Authority server 92. And then to correlate the User's clinical data to the User's identity, the Registration Authority's server 82 would have to be hacked as well.

New Users who cannot be authenticated online via the foregoing process will be referred to a support desk or their medical plan by telephone or secure e-mail. Users passing this supplemental authentication will receive a single use Web ID and password by encrypted e-mail or US Postal Service, which will let them access the Web site and create standard Web IDs and passwords.

The process for recovering a forgotten password is very similar. In password recovery, the user is challenged by the Certificate Authority server 92 to answer a set of identifying questions randomly selected from a larger group, which the User provided when the account was set up. If enough questions are answered correctly, then the User is permitted to reset the password. The user might select the same password as before, but the Certificate Authority neither knows nor cares (the password is encrypted using itself as a key, and is not recoverable by the Certificate Authority, which can, however, set a new one). In account recovery, everything proceeds as for a new User, except the Registration Authority tells the Web site 10 that an existing UAI is involved and mails an activation code. The Web site 10 disables customizations until the User submits the new activation code. The User can now set a new password via the Certificate Authority and create a new master list of questions and answers for roaming and lost password authentication.

d. Login Procedure

Figure 5:
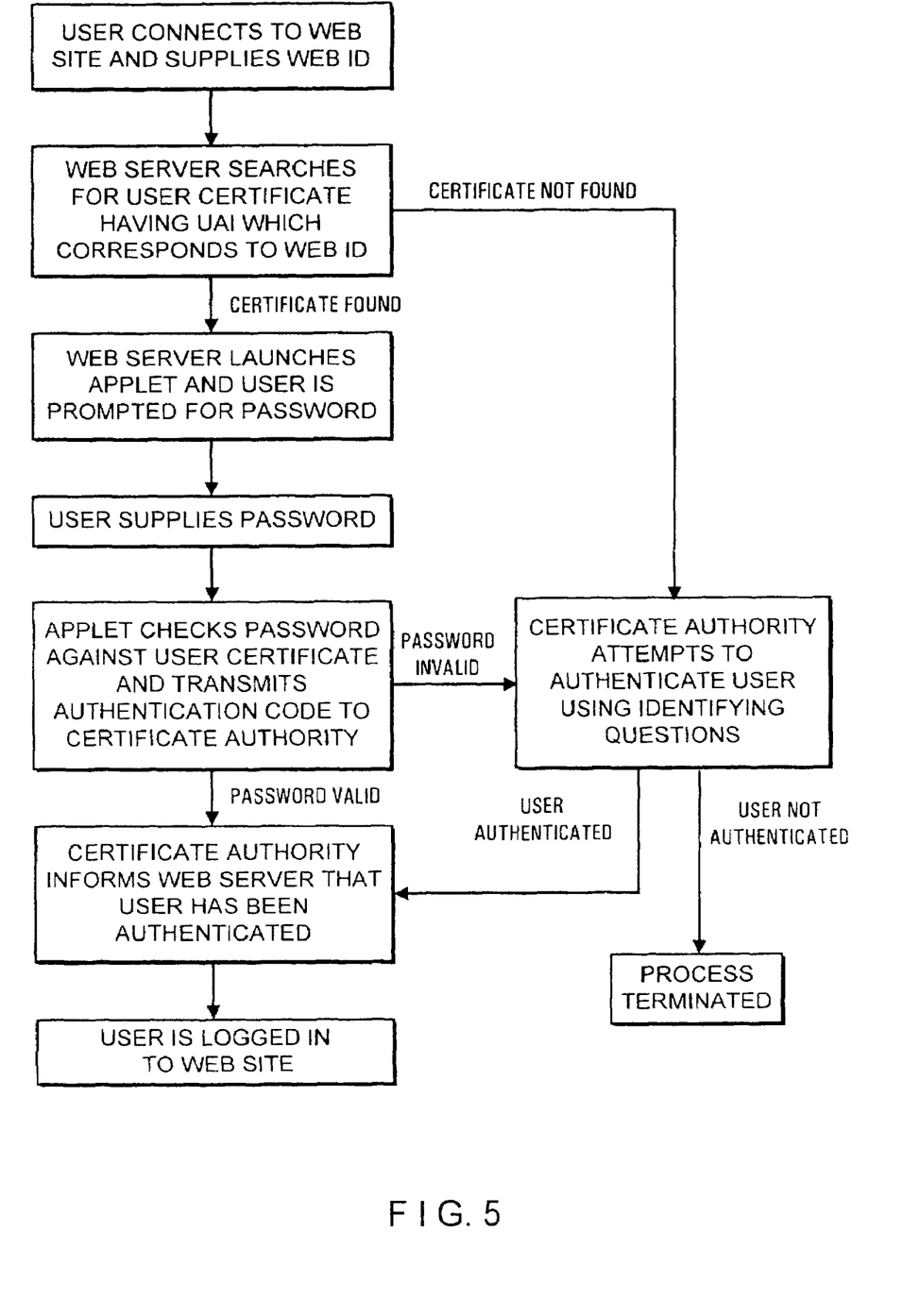
FIG. 5 is a chart illustrating the procedure for logging in to the Web site.

Once a User has his/her Web ID and password, the User will use them to log on to the Web site 10 and access the information contained therein. Referring to FIG. 5, the User will connect to the Web site 10 using his browser 89 and click into the login page 16. In response to the login command issued by the User, the User will be prompted by the Web site 10 to input his/her Web ID. The Web site 10 then searches the User's certificates on the User's computer 90 for one with the encrypted UAI associated with the Web ID the User has input. If none is found, the User is assumed to be roaming, and the Certificate Authority server 92 is contacted to begin the question and answer process. However, if a matching certificate is found, the Web site 10 launches the authentication applet 93 which prompts the User for his/her password. Note that at no time does the Web site 10 receive the User's password.

The applet 93 checks the password against the password embedded in the user certificate 91, generates an authentication code, and transmits the authentication code over the Internet to the Web server 54, which then passes the authentication code to the Certificate Authority server 92. If the authentication code returned by the applet 93 is negative, indicating an incorrect password, the Certificate Authority server 92 will attempt to authenticate the User by seeking answers to the identifying questions previously designated by the User. This is done through encrypted forms passed through the Web server 54. If it is not already present, the applet 93 is downloaded first so that the forms are secured from interpretation by the Web server 54 or any listening hackers. If the User successfully answers the identifying questions, the Certificate Authority authenticates the User and passes the session to the Web server 54. If, however, the User is unable to answer the identifying questions correctly, then the login process is terminated.

In some situations a User may be roaming and attempt to login to the Web site 10 from a foreign computer, i.e., a computer that does not contain a user certificate and applet for the User. In that case, after the Certificate Authority obtains correct answers from the User to the identifying questions, the User will be asked if he/she wishes to download a user certificate to the foreign computer for future logins. If the User does not consider the foreign computer secure or likely to be used again soon, then the answer will be no, and subsequent logins from that computer will continue to use the question and answer authentication process.

If the User has been authenticated by the Certificate Authority Server 92, the Certificate Authority Server 92 will so advise the Web server 54 and the User will be logged in to the Web site 10.

It should be noted that for ease of discussion, the Web server 54 is used as the login server. In practice, however, as those of ordinary skill in the art will appreciate, a separate login server may be used so that the Web server 54 is not unnecessarily tied up resulting in slow service to the Users.

For additional security, all communications throughout the system will preferably be encrypted using standard encryption techniques, such as such as 128-bit secure-sockets-layer (SSL) encryption.

e. Customization

Once the User has logged on the Web site 10, the User may freely navigate and search for information of interest to the User. However, the User may also seek to enjoy customized service. In order to receive customized service, the User will, upon login, elect to receive customized service by transmitting his/her customization activation code to the Web server 54. The Web server 54 will then check the user database 44 to make sure that the customizations activation code presented by the User is valid. Once customizations are activated, they will remain activated for all subsequent logins until they are de-activated by unchecking a personal customizations box. However, customizations may be reactivated just by clicking the box to add a check. Barring administrative interventions such as account recovery, the activation code only needs to be used once.

In order to provide customized services to the Users based on their respective medical histories, each Web page (or link) on the Web site is indexed by ICD-9-CM, CPT-4, NDC and HCPCS J-codes in addition to keyword. This indexing is realized through use of the link table 46. The link table 46 is a list of the URL of every Web page on the Web site 10 with corresponding keywords, ICD-9-CM, CPT-4, NDC and HCPCS J-codes in their respective columns. The codes are assigned to particular Web pages by trained medical professionals based on the content of the particular Web pages. The assignments are highly discretionary and will vary from medical professional to medical professional. It will be appreciated by those of ordinary skill in the art that the present invention is not limited to the foregoing coding systems, but may be used with any coding system.

Figure 6:
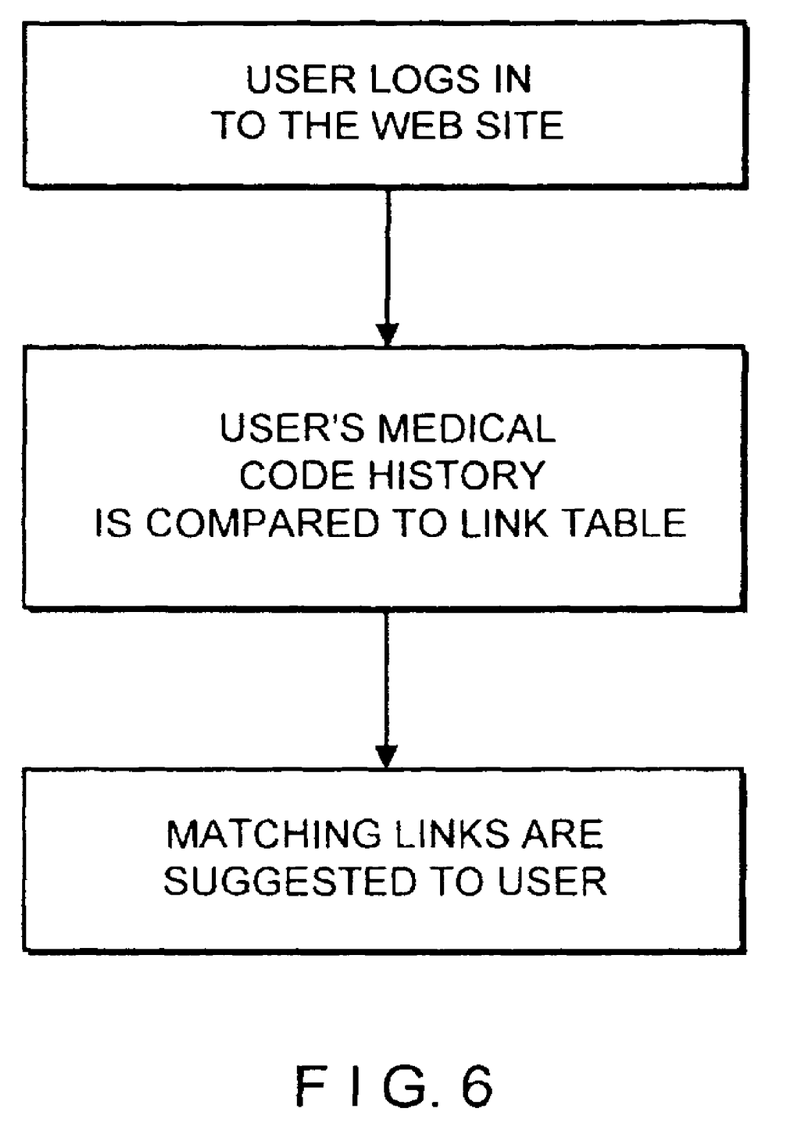
FIG. 6 is a chart illustrating a first method of customization.

Referring to FIG. 6, in accordance with one method of customization, the Web server 54 may be configured so that upon login to the Web site 10 by a User, the ICD-9-CM, CPT-4, NDC, and HCPCS J-code history of the User as found in the user database 44 is compared to the link table 46. For each Web page having an associated code that matches any of the User's codes, the Web page is suggested to the User for browsing. The benefits of this method of customization will be apparent to those of ordinary skill in the art. Rather than suggesting Web pages based on the browsing history of the User, Web pages are suggested to the User based on the User's unique medical history, resulting in a highly informed customization process. This method of customization can also be accomplished through the search engine, as discussed below.

Figure 7:
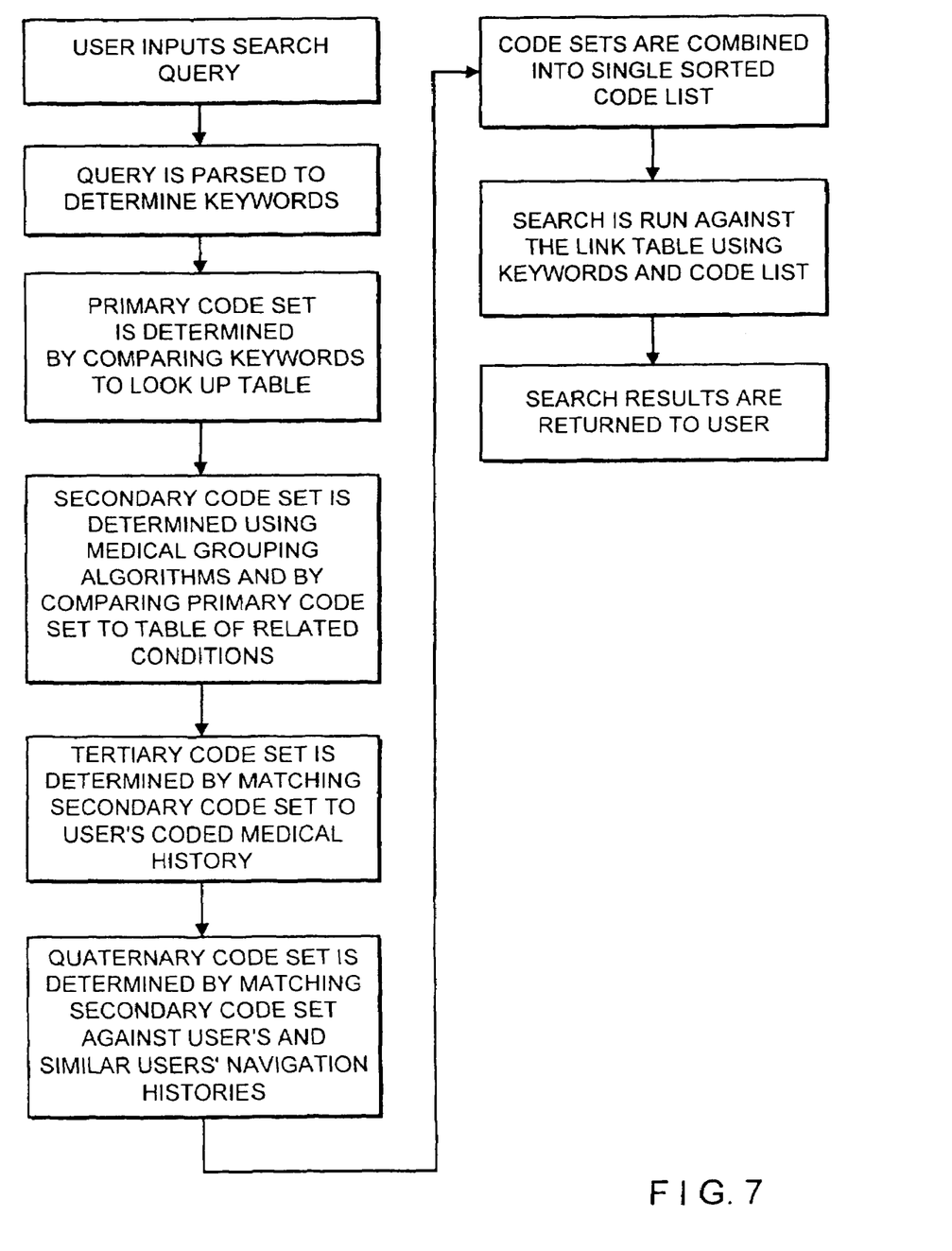
FIG. 7 is a chart illustrating a second method of customization via the search engine.

In accordance with another method of customization, customization may also be provided using the search engine 22. Typical prior art search engines use keywords to search the Web site. However, because the entire Web site 10 is indexed by medical codes in addition to keyword (as used herein, the term "keyword" includes individual words as well as phrases), the User's medical code history may be used to modify and enhance the search so that more relevant information is returned to the User.

Referring to FIG. 7, the User will input a query to be searched. A spell checker portion of the search engine 22 proposes corrections which the user might approve. The query is then parsed and phrases are identified and removed therefrom. Individual words are then identified from that part of the query which is not a key phrase.

The keywords (phrases and individual words) are then matched to medical codes through comparison to the keyword to ICD-9-CM/CPT-4/NDC/HCPCS J-code look up table 48. The keyword to ICD-9-CM/CPT-4/NDC/HCPCS J-code look up table 48 is a table that correlates keywords to by ICD-9-CM, CPT-4, NDC and HCPCS J-codes related to the keywords. Entries in the table are made by trained medical professionals on a discretionary basis.

The medical codes retrieved from the look up table 48 form a "primary code set". The codes in the primary code set are assigned a relevancy score based on how many keywords matched to them. Medical codes used in the search process include, but are not limited to, ICD-9-CM, CPT-4, NDC, and HCPCS J-codes.

The primary code set is next input into a variety of medical code grouping algorithms, producing a set of medical code groups. These groupings include a variety of third party tools used to associate medical codes into larger sets for a variety of purposes. Among those groupings lending themselves to usage as is required to expand the medical code search set are the Johns Hopkins ACG (Adjusted Clinical Groups) and DxCG Inc.'s DCG-HCC (Diagnostic Cost Groups—Hierarchical Coexisting Conditions).

A "secondary code set" is extracted from each medical code group by running the grouper backwards to produce all of the many codes that can potentially contribute to the group. In addition to the codes returned by running the medical groupers backwards, codes related to those in the primary set are derived from the table of related conditions 50 and are added to the secondary code set. The table of related conditions 50 is a list of ICD-9-CM, CPT-4, NDC and HCPCS J-codes codes in their respective columns and related ICD-9-

CM, CPT-4, NDC and HCPCS J-codes in their respective columns. As with the keyword to ICD-9-CM/CPT-4/NDC/HCPCS J-code look up table, code relatedness is determined by trained medical professionals and is highly discretionary. The codes in the secondary set are assigned a relevancy score based on how many groups produced the code.

The secondary code set is then matched against medical codes from the User's medical history in the user database 44. Those secondary codes which are also in the history from a "tertiary code set". Each code in the tertiary code set is assigned a relevancy score based on the code's score in the secondary set and the recentness of the occurrence of the code in the User's medical history.

A "quaternary code set" is produced by matching the secondary code set against codes from the User's site navigation history and the site navigation histories of similar users, as contained in the user tracking database 52, which lists the Web pages previously visited by each User, along with the ICD-9-CM, CPT-4, NDC and HCPCS J-codes corresponding to those Web pages. Each time the User visits a Web page, the Web page URL and associated codes are recorded in the tracking database 52. The codes in the quaternary set are assigned relevance scores based on relatedness to the user, frequency of use, and recentness of use.

The four sets of codes are combined into a single sorted list in the following manner:

1. Those codes in the primary set which are also in the tertiary and quaternary sets come first. The codes are put in order by their primary set relevance scores with ties in order by their tertiary set relevance scores, with remaining ties in order by their quaternary set relevance scores.
2. The remaining codes in the primary set which are also in the tertiary set come next, ordered by primary then tertiary scores.
3. The remaining codes in the primary set which are also in the quaternary set come next, ordered by primary then quaternary scores.
4. The remaining codes in the primary set which are also in the secondary set come next, ordered by primary then secondary scores.
5. Any remaining codes in the primary set come next, ordered by primary scores.
6. The remaining codes in the tertiary set which are also in the quaternary set come next, ordered by tertiary then quaternary scores.
7. Any remaining codes in the tertiary set come next, ordered by tertiary scores.
8. Any remaining codes in the quaternary set come next, ordered by quaternary scores.
9. Lastly come any remaining codes in the secondary set, ordered by secondary scores.

The search query is then modified to include the sorted code list in addition to the keywords. The search is run against the link table 46 and the results are displayed for the User.

Preferably, the search engine 22 will have a basic search function and an advanced search function. In the basic search function, for each of seven content categories—Care Guide, Disease Guide, Medical Encyclopedia, Medical Dictionary, Drug Guide, Medical News, and User Forums—the sorted list of codes is matched in sorted order to the content until 3 items are found for each category. If less than 21 items are produced, then the remaining content "slots" are filled by matching the codes in sorted order to all content, discarding content already used to fill a slot. In the advanced search function, the user can specify how many slots, including "unlimited", should be filled for each content category, and which categories should come before which others on the result list.

When a user who has activated customization logs in to the Web site 10, a search using the search engine 22 may be automatically run on behalf of the User. This will be a basic search on the medical codes from the User's recent medical history, the User's gender, age, the top 20 codes from the User's site navigation history, and the top 20 codes from the site navigation history of similar users. The User does not see the actual query. However, the 21 results are automatically presented whenever the user logs in or submits a blank query. These 3 most relevant selections from each of the 7 content areas will provide users with the medical information most relevant to their current conditions and demonstrated interests.

Figure 8:
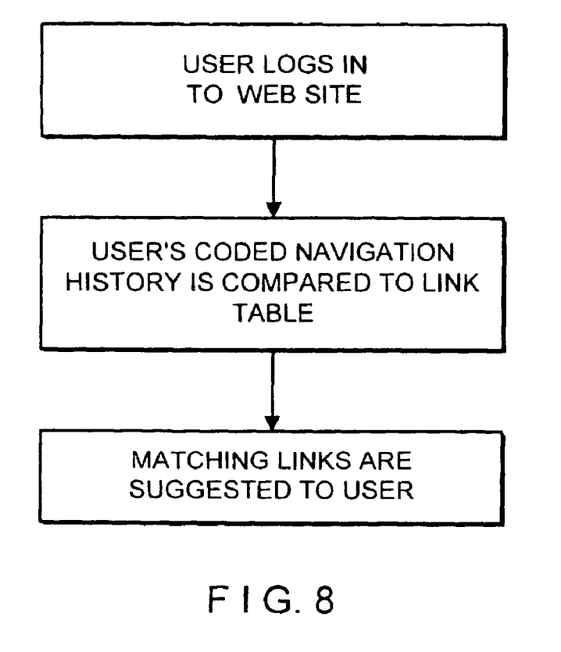
FIG. 8 is a chart illustrating a third method of customization.

Referring to FIG. 8, in accordance with another method of customization, it is also possible to customize the Web browsing experience through use of the tracking database 52. By comparing the ICD-9-CM, CPT-4, NDC and HCPCS J-codes codes in the User's tracking database entry with the link table 46, additional Web pages which have matching by ICD-9-CM, CPT-4, NDC and HCPCS J-codes may be suggested to the User.

Figure 9:
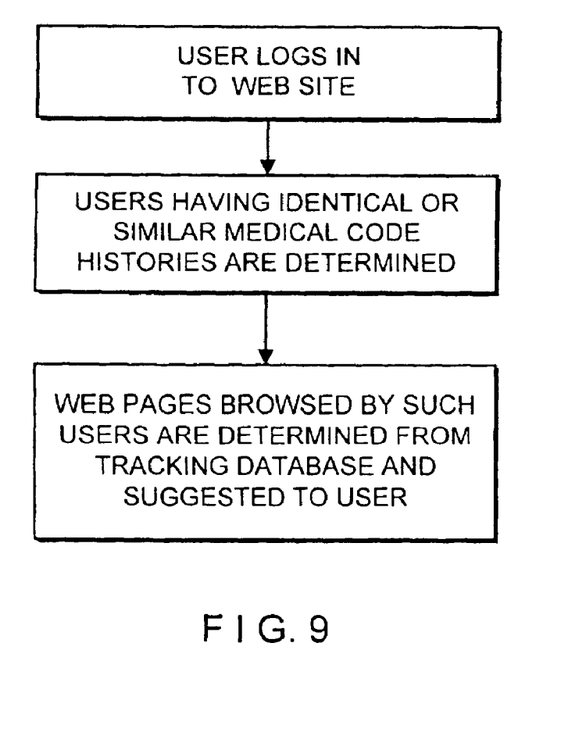
FIG. 9 is a chart illustrating a fourth method of customization.

Referring to FIG. 9, in accordance with another method of customization, the tracking database 52 also makes it possible to customize based on where other Users with similar medical histories have browsed. Thus, Web pages which have been visited by users having identical or similar ICD-9-CM, CPT-4, NDC and/or HCPCS J-codes may be suggested to the User. For example, assume that a User has disease X which is indicated by ICD-9-CM code Y. Upon login, the Web server 54 may be configured to search the tracking database 52 and suggest Web pages to the User which were visited by other Users having ICD-9-CM code Y in their medical histories.

In accordance with another method of customization, use of ICD-9-CM, CPT-4, NDC and HCPCS J-codes also makes it possible to develop content profiles into which Users having specifically similar medical histories, i.e. identical or very similar code combinations, may be grouped. For example, patients experiencing chest pain (ICD-9-CM 786), angina pectoris (ICD-9-CM 413), myocardial infarction (ICD-9-CM 410, 412) and ischemic heart disease (ICD-9-CM 414) may undergo procedures such as cardiac catheterization, angioplasty and coronary artery bypass graft surgery (CPT-4 33200-33235, 33305, 33315, 33332-33335, 33510-33536, 33999, 36013-36015). This grouping allows the customization and delivery of a body of knowledge to a group of people at different points in the spectrum of the same disease process.

Content profiles are determined by trained medical professionals and are largely discretionary. Thus, the Web server 54 may be configured on log in to look up in the user database 44 all Users having the same content profile(s) as the logged on User. The Web server 54 then looks those users up in the tracking database 52 and suggests to the User the Web pages previously visited by those Users.

In accordance with another method of customization, the tracking database 52 also provides means for statistically tracking Web site usage of Users having similar medical conditions. By analyzing the browsing habits of Users having similar medical conditions, statistically relevant Web pages may be suggested to each such User. As an example, based on ICD-9-CM codes, the Operator can determine, by consulting the user database 44, which of its Users have disease X. By then consulting the tracking database 52 and statistically analyzing the browsing preferences and patterns of Users who have disease X, the Operator may make meaningful statistical determinations as to which Web pages will likely be of interest to Users having disease X. Those Web pages may then be suggested to any User having disease X who logs on to the Web site.

The foregoing embodiments illustrate only a handful of ways in which a User's browsing experience may be customized in accordance with the present invention. It will be realized by those of ordinary skill in the art, however, that the present invention is not limited to the foregoing embodiments. Rather, this invention is extremely versatile and may be used to provide a customized browsing experience in an unlimited number of ways.

It will also be apparent to those of ordinary skill in the art that while the UAI method will be preferably used to ensure privacy of the Users' medical histories, the present invention as it relates to customization may be practiced without using UAI's and may in fact be practiced using identifiable medical data if desired.

Thus, in accordance with the foregoing, the objects of the present invention are achieved. Modifications to the above would be obvious to those of ordinary skill in the art, but would not bring the invention so modified beyond the scope of the appended claims.

We claim:

1. A method of transferring personal information, including medical information, of a plurality of users from a first database in which said personal information is identifiable with particular users to a second database associated with a web server in which said personal information is de-identified, said method comprising the steps:

uploading to said second database associated with said web server de-identified personal information, including medical information, of said users from said first database;

uploading to said second database from a third database associated with a registration authority server anonymous IDs for each of said users; and indexing said de-identified personal information, including medical information, of said users in said second database by anonymous ID without providing indexing to said first database.

2. A method of authenticating an anonymous user of a World-Wide-Web (WWW) site residing on a web server, said user requiring a web ID and a password to log on to said WWW site, said method comprising the steps:

verifying the true identity of said anonymous user on a registration authority server;

creating said web ID on said web server, said web server including de-identified personal information including medical information of said user; and creating said password on a certificate authority server;

wherein said registration authority server, said web server, and said certificate authority server are operated separately from each other to preserve anonymity of said user, whereby the only party which knows the true identity, web ID and password of the user is the user.

3. The method according to claim 2 wherein on subsequent log ins to the WWW site by said user said password is authenticated by said certificate authority server and said Web ID is authenticated by said Web server.

* * * * *